United States Patent
Forgue et al.

(10) Patent No.: US 8,113,785 B2
(45) Date of Patent: Feb. 14, 2012

(54) TURBOMACHINE ROTOR AND TURBOMACHINE COMPRISING SUCH A ROTOR

(75) Inventors: Jean-Bernard Forgue, Montacher-Villegardin (FR); Patrick Jean-Louis Reghezza, Vaux le Penil (FR); Alain Timon, Paroy (FR)

(73) Assignee: SNECMA, Paris (FR)

( * ) Notice: Subject to any disclaimer, the term of this patent is extended or adjusted under 35 U.S.C. 154(b) by 1265 days.

(21) Appl. No.: 11/770,341

(22) Filed: Jun. 28, 2007

(65) Prior Publication Data

US 2008/0003108 A1   Jan. 3, 2008

(30) Foreign Application Priority Data

Jun. 29, 2006  (FR) ..................................... 06 05851

(51) Int. Cl.
*F04D 29/34*  (2006.01)
(52) U.S. Cl. ................................... 416/220 R; 416/248
(58) Field of Classification Search ................... 416/221, 416/219 R, 220 R, 248
See application file for complete search history.

(56) References Cited

U.S. PATENT DOCUMENTS

| 4,033,705 | A | | 7/1977 | Luebering |
| 4,344,740 | A | | 8/1982 | Trenschel et al. |
| 5,259,728 | A | * | 11/1993 | Szpunar et al. ................... 416/2 |
| 5,282,720 | A | | 2/1994 | Szpunar |
| 6,910,866 | B2 | * | 6/2005 | Bassot et al. .................. 416/221 |

FOREIGN PATENT DOCUMENTS

EP   1 400 698 A1   3/2004

\* cited by examiner

*Primary Examiner* — Edward Look
*Assistant Examiner* — Dwayne J White
(74) *Attorney, Agent, or Firm* — Oblon, Spivak, McClelland, Maier & Neustadt, L.L.P.

(57) ABSTRACT

A turbomachine rotor comprising a disk the periphery of which has a plurality of slots, a plurality of removable blades, each blade comprising a blade root housed in one of the slots, and a downstream flange, secured to said disk and against which each blade root bears. Further, the rotor comprises, between each blade root and the downstream flange, an elastic buffer intended to maintain a gap between the blade root and the downstream flange.

19 Claims, 4 Drawing Sheets

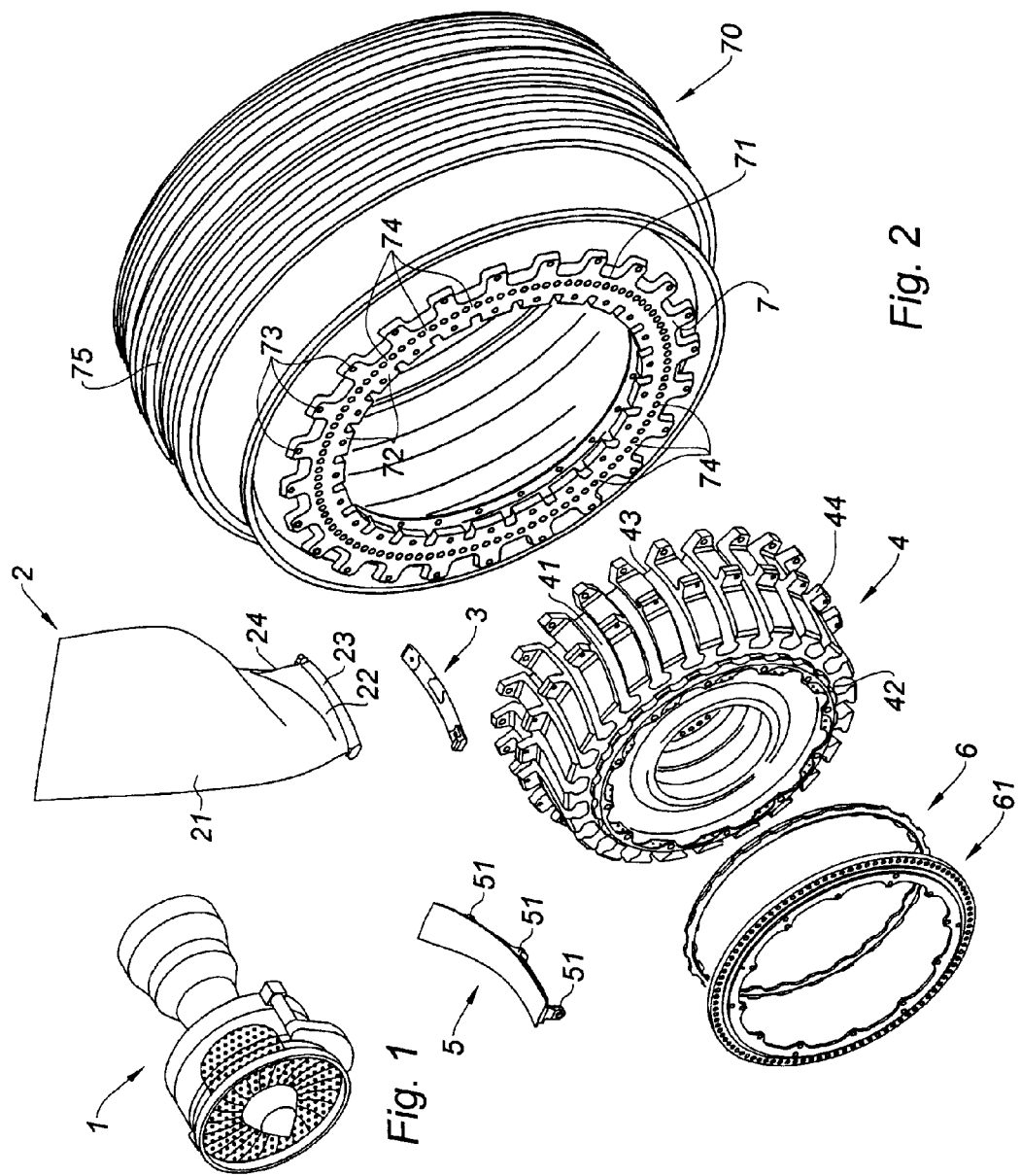

TURBOMACHINE ROTOR AND TURBOMACHINE COMPRISING SUCH A ROTOR

The present invention relates to a turbomachine rotor, particularly to the attachment of the blades, particularly fan blades, to a rotor disk.

BACKGROUND OF THE INVENTION

A turbomachine rotor conventionally comprises, on the one hand, a disk the periphery of which has a plurality of substantially axial and uniformly angularly distributed slots and, on the other hand, a plurality of removable blades which extend radially outwards from the periphery of said disk, each blade comprising a blade root housed in one of the slots.

DESCRIPTION OF THE PRIOR ART

When the root of a blade is inserted in a slot, its downstream part comes into contact with a downstream flange secured to the rotor and lying downstream of the slot. The blade root bears against the downstream flange which acts as an axial end stop. Axial retention is usually ensured by installing a removable upstream flange, which may be in the form of a retaining ring. When this upstream flange is fixed to the disk, for example using bolts, it prevents the root from leaving the slot in the rotor disk. Upstream and downstream are defined with respect to the main direction in which air flows through the rotor. An axial retention system such as this is described in particular in document EP1400698, although the downstream flange is not depicted therein.

For assembly reasons, the blades are assembled on the disk with an axial clearance. The haphazard way in which the fan blades are positioned within this clearance unbalances the rotor and causes vibration during operation. The longer the chord of the aerodynamic profiles of the fan blades, the greater this vibration is. In operation, the considerable centrifugal forces that the blades have to withstand can also cause the blades to move around unpredictably in the axial direction within this axial clearance.

In order to prevent any axial movement of the blades while the turbomachine is running, the upstream flange is equipped on its downstream face with elastic means, such as elastomer blocks, intended, after assembly, to exert enough force on the upstream faces of the blade roots that said blade roots are held against the downstream flange. In this system, the upstream flange is made as a single piece and has an annular shape. According to documents U.S. Pat. No. 5,259,728 and U.S. Pat. No. 6,457,042, axial retention may also be afforded by a plurality of small flanges positioned between the slots.

The system described in document EP1400698 is not, however, entirely satisfactory. This is because wear occurs on the downstream flange. This wear is caused by the rubbing of the blade roots against the downstream flange and reduces the life of said downstream flange. When this downstream flange consists, as is often the case, of the forward flange of a compressor casing, that is to say the part of substantially cylindrical shape supporting the compressor blades downstream of the fan blades, the loss of a blade is at stake.

This wear essentially appears when the turbomachine is at rest exposed to the wind, rather than when the turbomachine is running, for example when an aircraft comprising a turbomachine such as this is stationary in a parking area. The ambient wind generally causes the turbomachine rotor to turn and to windmill. The rotor blades are mounted in the slots of the disk with also a clearance allowing them some radial travel, which disappears when the turbomachine is running because of the centrifugal forces. When, in the present invention, a blade is said to have radial travel, this is to be understood as meaning a small-amplitude rotation of said blade in the slot of the disk about an axis substantially parallel to the axis of the rotor. As the rotor turns slowly, driven by the wind, the blades, especially the fan blades, experience a radial travel, as a result of gravity, under the effect of their own weight, especially as these reach a horizontal position. The combined effect of, on the one hand, a radial travel of the blade and, on the other hand, the bearing of this blade against the downstream flange, because of the forces generated by the elastomer blocks upstream, causes the wear observed.

This wear can also appear during repeated manipulation of the turbomachine rotor, for example during maintenance operations or when a rotor is turning at a very low speed. In general, this wear appears in all situations where the rotor is turning in such a way that radial movement of a blade can occur.

SUMMARY OF THE INVENTION

It is one objective of the present invention to eliminate the wear between the rotor blades and the downstream flange.

The invention relates in particular to a turbomachine rotor comprising a disk the periphery of which has a plurality of slots, a plurality of removable blades, each blade comprising a blade root housed in one of the slots, and a downstream flange, secured to said disk and against which each blade root bears. According to the invention, the rotor comprises, between each blade root and the downstream flange, an elastic buffer intended to maintain a gap between the blade root and the downstream flange.

Advantageously, the elastic buffer has a shape able to clip onto the downstream part of the blade root. Ideally, this buffer has a U-shape comprising a base which bears against the downstream face of the blade root and two branches which bear against the lateral faces of the blade root. The base may, on its downstream face, comprise at least one spike acting as a grip-enhancing stud.

This elastic buffer may equally well clip onto the downstream flange instead of the downstream part of the blade root.

The invention also relates to a turbomachine comprising such a rotor.

BRIEF DESCRIPTION OF THE DRAWINGS

The invention will be clearly understood and its advantages will become better apparent from reading the detailed description which follows. The description makes reference to the attached figures in which:

FIG. 1 is a schematic view of a turbomachine;

FIG. 2 is an exploded view of a turbomachine rotor;

DESCRIPTION OF THE PREFERRED EMBODIMENTS

Figure 3:
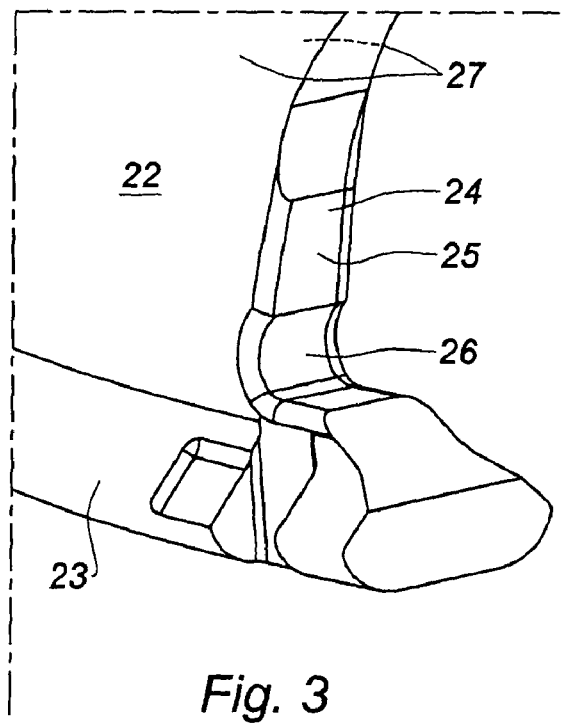
FIG. 3 is a view of a downstream part of a blade root according to the prior art.

FIG. 1 depicts a turbomachine 1 of the turbofan type. A turbomachine in the conventional way comprises a fixed assembly constituting the stator and a rotary assembly constituting the rotor. The uniformly spaced dots in FIG. 1 correspond to the location of the rotor that forms the subject of the invention.

FIG. 2 depicts, in an exploded view, the main parts that constitute a turbomachine rotor, more especially the parts that can be used for mounting the fan blades 2, apart from the bolts.

A blade 2 comprises an aerodynamic profile 21, in the form of a twisted vane, and a blade root 22. The blade root 22 is the lower part of the blade 2 which does not interact with the aerodynamic flow. Usually, the aerodynamic profile 21 and the blade root 22 are demarcated by a platform 5 that is removable or secured to the blade.

When it is mounted on a rotor disk 4, the blade root 22 is inserted into one of the substantially axial slots 41 in the disk 4 and bears against a downstream flange 7 positioned at the downstream end 43 of the slot 41. The downstream flange 7, as depicted in FIG. 2, has an annular shape and is secured to a compressor casing 70, of substantially cylindrical shape and comprising circumferential slots 75 intended to accommodate compressor blades (not depicted). The downstream flange 7 may equally well be independent of the drum 7 and consist merely of a one-piece part of annular shape or of a plurality of mutually independent annular parts. The downstream flange 7 mainly comprises a ring 71, extending radially and equipped on its internal and external peripheries with internal fixing flange element 72 and external fixing flange element 73, respectively. The downstream flange 7 and the disk 4 may be secured to one another using bolts (not depicted). The aforementioned wear is located chiefly on the ring 71 between each flange element 72 or 73 at local surfaces referenced 74.

Platforms 5 are positioned between two successive blades 2 in order to rebuild an aerodynamic stream. These platforms 5 are attached by their flange elements 51 to flange elements 44 of the disk 4. It is also common practice for a spacer 3 to be inserted between the blade roots 22 and the closed end of the slot 41 in the disk 4.

To provide axial retention, a removable upstream flange 6 is fixed to the upstream end 42 of the slots. The upstream flange 6, as depicted in FIG. 2, has an annular shape. It prevents the blades 2 from disengaging from the slot 41 via the upstream end 42. An additional second annular flange 61 may also be positioned upstream of the flange 6 and may possibly be equipped on its downstream face with elastic means, for example elastomer blocks as described in document EP1400698. It is fixed to the disk 4 using bolts (not depicted).

FIG. 3 depicts a lower downstream part of a blade root 22. The blade root 22 at its base comprises a tenon 23 designed to be housed in a slot 41 in the disk 4. The downstream part 24 of the blade root 22 comprises a surface 25 and a recess 26 lying between the surface 25 and the tenon 23. The initial function of this recess 26 is to avoid stresses in this area. Advantageously, the axial buffer may be housed in this recess 26 in order to maintain a gap between the blade root 22 and the downstream flange 7.

Figure 4:
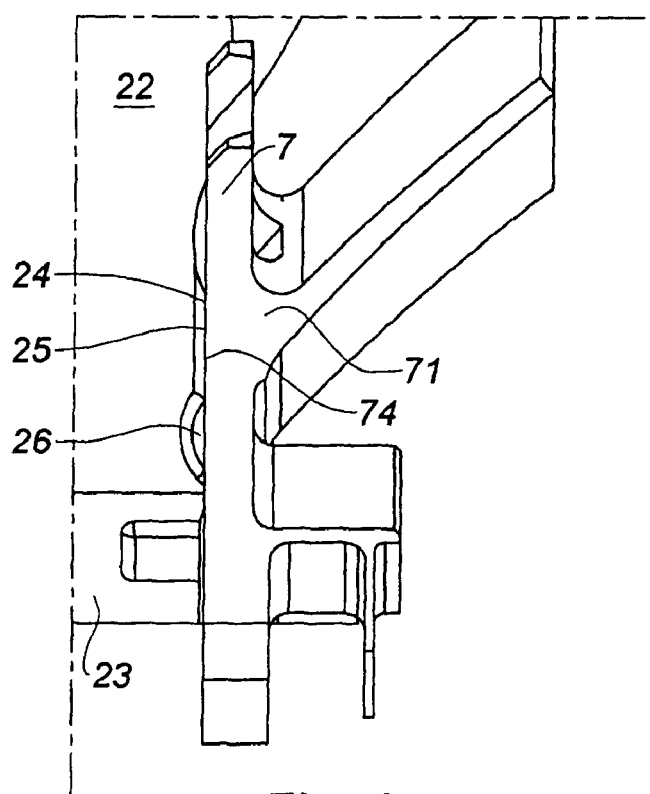
FIG. 4 is a view of a downstream part of a blade root bearing against a downstream flange according to the prior art.

As depicted in FIG. 4, the surface 25, which is substantially planar, of the blade root 22 comes into contact with a surface 74 of the ring 71 of the downstream flange 7. This contact is responsible for the aforementioned friction wear.

In order to reduce or even eliminate this wear, the invention proposes to modify the turbomachine rotor by inserting between each blade 2 and the downstream flange 7 an elastic buffer 8 that is intended to maintain a gap between the blade 2 and the downstream flange 7, at least when the rotor is not running.

Figure 5:
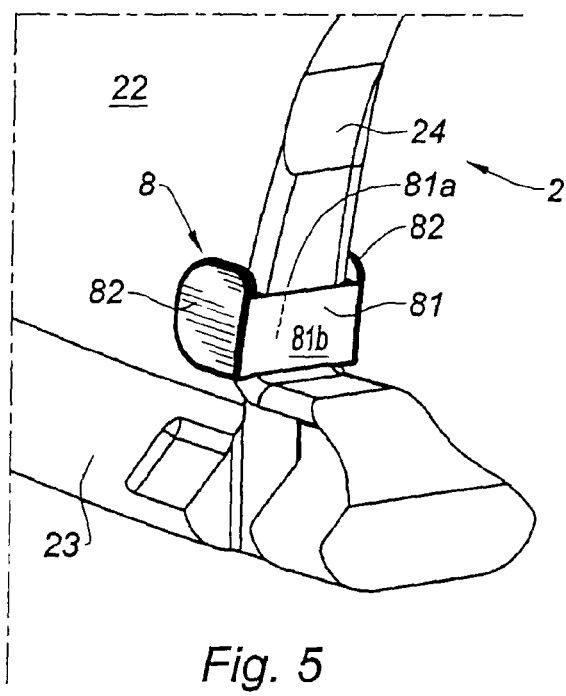
FIG. 5 is a view of a downstream part of a blade root according to the invention.
Figure 6:
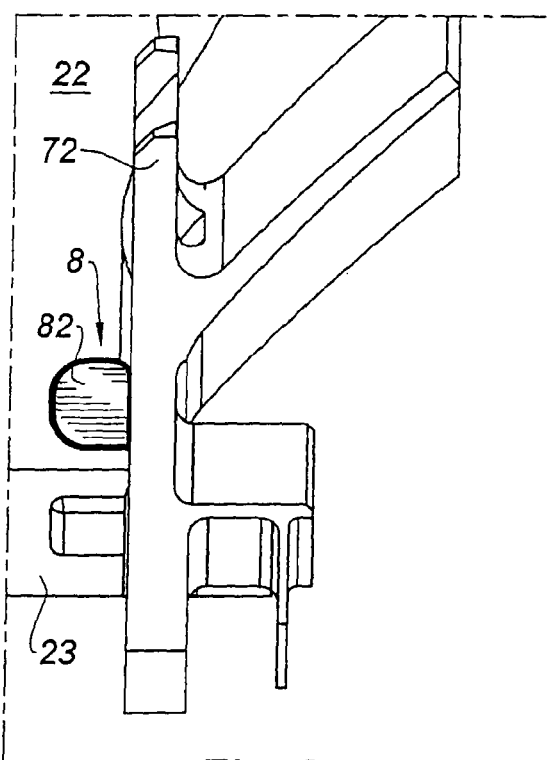
FIG. 6 is a view of a downstream part of a blade root bearing against a downstream flange according to the invention.

FIGS. 5 and 6 correspond respectively to FIGS. 3 and 4 and also feature the aforementioned elastic buffer 8. The elastic buffer 8 has a shape able to clip onto the downstream part 24 of the blade root 2, that is to say able to grip the downstream part 24 in order to attach itself thereto. In order to do this, the elastic stop ideally has the shape of a U comprising a base 81 that bears against the downstream part 24 of the blade 2 and two branches 82 that bear against the lateral faces 27 of the blade 2. The ability of the elastic buffer 8 to clip on is aimed at making it easier to assemble the rotor and the turbomachine 1, certain parts of which are not readily accessible.

The branches 82 have a substantially flat shape. The base 81 also has a substantially flat shape and comprises an upstream face 81$a$ and a downstream face 81$b$. These shapes advantageously make it possible to limit the amount of space occupied by and the weight of the elastic buffer 8, these being constraints that are essential in aeronautical applications. Thus, an elastic buffer 8 such as this can be added to most rotors without resultant modifications to the other nearby components.

When a blade 2 has the possibility of radial travel, the elastic buffer 8 maintains a gap between the blade root 22 and the downstream flange 7. This gap prevents the rubbing that leads to wear. An appropriate gap measures between 0.1 and 0.8 mm. When the rotor is running, that is to say when the throttle is opened in order to drive the turbomachine 1, centrifugal forces prevent the rotor blades 2 from moving radially which means that friction between these blades 2 and the downstream flange 7 no longer occurs. Under these conditions, there is no need to maintain a gap between the blade root 22 and the downstream flange 7. The hardness of the elastic buffer may take these conditions into consideration.

The hardness of the elastic buffer has also to make it possible to damp the axial movement due to the pressure of the blade 2 against the downstream flange 7. An appropriate hardness for the elastic buffer 8 is obtained when it ranges between 40 and 80 Shore D, preferably between 65 and 75 Shore D. For example, the buffer may be made of a first material such as polyurethane elastomer with a hardness of 71 to 73 Shore D, or may be made of Peek® resin.

To improve the adhesion between the elastic buffer 8 and the downstream flange 7, the downstream face 81$b$ may be made of a second material the hardness of which is lower than the hardness of the first material, preferably having a hardness ranging between 50 and 70 Shore A, for example silicon elastomer with a hardness of 60 Shore A.

According to a first embodiment of the invention, the downstream face 81$b$ of the elastic buffer 8 is flat. To improve the adhesion between the elastic buffer 8 and the downstream flange 7, structural arrangements detailed in the second and third embodiments may be made.

Figure 7:
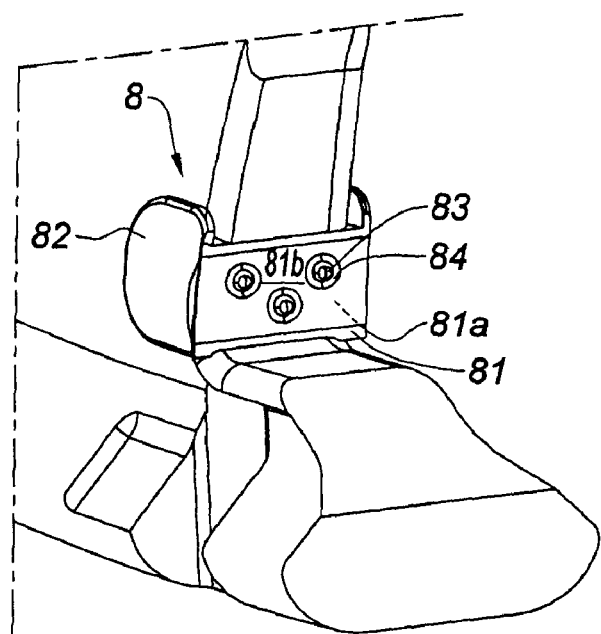
FIG. 7 is a view of a downstream part of a blade root bearing against a downstream flange according to a second embodiment of the invention.

According to a second embodiment of the invention, the elastic buffer 8 may comprise at least one spike 83, preferably three spikes, which are visible in FIG. 7. Each spike 83, which acts as a grip-enhancing stud, projects out from the plane defined by the downstream face 81*b* of the base 81 and lies in a circular recess 84 on the downstream face 81*b* of the base 81.

Figure 8:
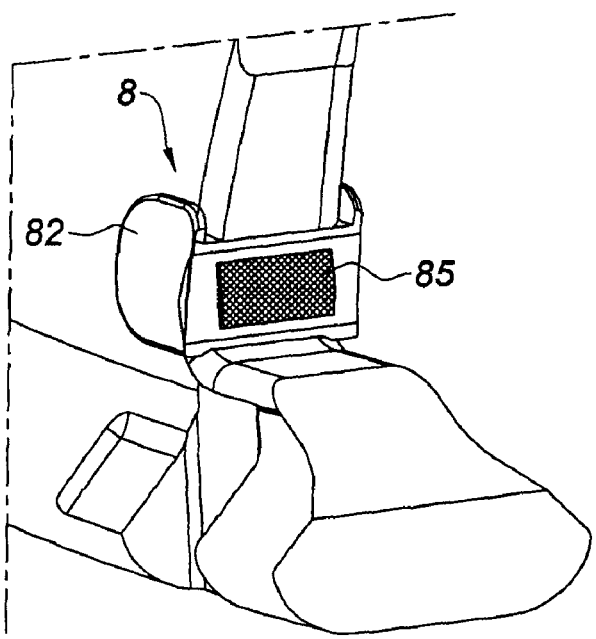
FIG. 8 is a view of a downstream part of a blade root bearing against a downstream flange according to a third embodiment of the invention.

According to a third embodiment of the invention, the elastic buffer 8 may comprise at least one rib 85 as depicted in FIG. 8. Other shapes may also be imagined in order to obtain good adhesion between the elastic buffer 8 and the downstream flange 7.

The invention is suitable for rotors comprising large blades, such as fan blades.

The invention claimed is:

1. A turbomachine rotor comprising:
   a disk, a periphery of which has a plurality of slots,
   a plurality of removable blades, each blade comprising a blade root housed in one of the slots, the blade root including a tenon at a base of the blade root, and
   a downstream flange, secured to said disk and against which each blade root bears, wherein
   said rotor includes, between a downstream part of each blade root and the downstream flange, an elastic buffer to maintain a gap between the blade root and the downstream flange, and
   said downstream part of each blade root is radially outside of the tenon of said blade root.

2. The turbomachine rotor as claimed in claim 1, wherein the elastic buffer has a shape to clip onto the downstream part of each blade root.

3. The turbomachine rotor as claimed in claim 1, wherein the elastic buffer has a shape to clip onto the downstream flange.

4. The turbomachine rotor as claimed in claim 2, wherein the elastic buffer has a U-shape including a base which bears against the downstream part of each blade and two branches which bear against lateral faces of each blade root.

5. The turbomachine rotor as claimed in claim 4, wherein each branch of the U-shape has a substantially flat shape.

6. The turbomachine rotor as claimed in claim 4 or 5, wherein the base of the U-shape has a substantially flat shape and includes an upstream face and a downstream face.

7. The turbomachine rotor as claimed in claim 6, wherein the base, on the downstream face, includes at least one spike as a grip-enhancing stud.

8. The turbomachine rotor as claimed in claim 7, wherein the base, on the downstream face, includes three spikes.

9. The turbomachine rotor as claimed in claim 7, wherein the spike projects out from a plane defined by the downstream face of the base.

10. The turbomachine rotor as claimed in claim 7, wherein the spike is situated in a circular recess on the downstream face of the base.

11. The turbomachine rotor as claimed in claim 6, wherein a hardness of the downstream face of the base ranges between 50 and 70 Shore A.

12. The turbomachine rotor as claimed in claim 11, wherein the downstream face of the base has a hardness of 60 Shore A.

13. The turbomachine rotor as claimed in claim 6, wherein the downstream face of the base is made of silicon elastomer.

14. The turbomachine rotor as claimed in claim 1, wherein a hardness of the elastic buffer ranges between 40 and 80 Shore D.

15. The turbomachine rotor as claimed in claim 14, wherein the hardness of the elastic buffer ranges between 65 and 75 Shore D.

16. The turbomachine rotor as claimed in claim 15, wherein the hardness of the elastic buffer ranges between 71 and 73 Shore D.

17. The turbomachine rotor as claimed in claim 1, wherein the elastic buffer is made of polyurethane elastomer.

18. The turbomachine rotor as claimed in claim 1, wherein each blade is a fan blade.

19. A turbomachine comprising a rotor as defined in claim 1.

* * * * *